United States Patent [19]

Courty et al.

[11] 4,000,085

[45] Dec. 28, 1976

[54] PROCESS FOR MANUFACTURING GELS CONTAINING IRON AND MOLYBDENUM AND THE USES THEREOF

[75] Inventors: Philippe Courty, Nanterre; Hubert Ajot, Le Fontanil; Bernard Delmon, Seyssins, all of France

[73] Assignee: Institut Francais du Petrole, des Carburants et Lubrifiants et Entreprise de Recherches et d'Activities Petrolieres Elf, Rueil-Malmaison, France

[22] Filed: Jan. 16, 1975

[21] Appl. No.: 541,404

Related U.S. Application Data

[63] Continuation of Ser. No. 8,063, Feb. 2, 1970, abandoned.

[30] Foreign Application Priority Data

Feb. 7, 1969  France ............................ 69.02995

[52] U.S. Cl. ...................... 252/301.1 S; 252/313 R; 252/470
[51] Int. Cl.² ...................... C09K 3/00; B01J 23/76
[58] Field of Search .............. 252/301.1 R, 301.1 S, 252/313 R, 470

[56] References Cited

UNITED STATES PATENTS

| | | | |
|---|---|---|---|
| 3,198,753 | 8/1965 | Traina | 252/470 |
| 3,408,309 | 10/1968 | Gessner | 252/470 |
| 3,459,807 | 8/1969 | Aglietti et al. | 252/470 X |
| 3,467,716 | 9/1969 | Kiff et al. | 252/470 X |
| 3,491,491 | 1/1970 | Ueltz | 252/313 R X |
| 3,496,117 | 2/1970 | Vesely et al. | 252/470 X |
| 3,498,927 | 3/1970 | Stiles | 252/470 X |

OTHER PUBLICATIONS

Weisler, Textbook of Colloid Chemistry, 2nd Ed., John Wiley & Sons, Inc., New York, 1949, pp. 157–160.

*Primary Examiner*—Leland A. Sebastian
*Attorney, Agent, or Firm*—Millen, Raptes & White

[57] ABSTRACT

Gels containing molybdenum and iron and optionally other metals, are useful in the production of catalysts or as optical filters. They are produced by conducting essentially a solid - solid reaction between a compound of molybdenum, e.g. ammonium molybdate, and a ferric compound, e.g., ferric nirate, thereby obtaining the same ratio of molybdenum and ferric contents in the gels, as used in the starting materials. Furthermore, the resultant gels are highly homogeneous, and when used as catalysts, the yields of the process are up to plus 99%.

19 Claims, No Drawings

PROCESS FOR MANUFACTURING GELS CONTAINING IRON AND MOLYBDENUM AND THE USES THEREOF

CROSS REFERENCE TO RELATED APPLICATION

This invention is also related to applicants' copending application Ser. No. 678,306, filed Apr. 19, 1976.

This is a continuation of application Ser. No. 8,063 filed Feb. 2, 1970, now abandoned.

This invention relates to the manufacture of inorgainic complexes, in the form of solid and transparent gels, of ferric ions with molybdenum ions.

Another object of this invention is the use of these gels as light filters or as precursors of mixed oxides between the iron and molybdenum oxides, some of which may be used as catalysts in the oxidation of primary alcohols to aldehydes, and more particularly of methanol to formaldehyde.

The main object of this invention is the manufacture of complex gels of the ferric ions with the molybdenum ions, by admixing at least one molybdic compound with at least one ferric compound in the presence of a water amount not higher than the total of the respective amounts required to form aqueous saturated solutions of the individual components of the mixture. This water is preferably the hydration water of the reactants when crystallized compounds are used as hydrates. It may also consist of water added to the mixture of the reactants.

The reactants may be admixed with one another in any known manner. The mixture of the reactants which is initially in the form of a powder or a paste, is transformed either to a homogeneous paste or to a clear solution. Each of them spontaneously hardens to a transparent, crystallographically amorphous, hard and brittle gel.

The invention applies particularly to mixtures in which the molybdenum and ferric compounds are in such proportions that the ratio of the number of molybdenum atoms to the number of iron atoms (Mo/Fe) is between 0.4 and 5. The atomic ratio (Mo/Fe) in the gel resulting from the treatment according to this invention is also between 0.4 and 5.

Besides the molybdenum and ferric compounds, compounds of other metals may be introduced into the starting mixture of this invention; these compounds may be used either as simple cations (for example cobalt, nickel, manganese, chromium, scandium, yttrium and the rare earth metals of atomic Nos. from 57 to 71 inclusive, these metals being referred to as M), or as oxygen-containing complexed ions (for example tungsten, chromium, manganese, uranium and vanadium, referred to as N).

The addition of these metal compounds must be carried out in such amounts that the ratio of the number of molybdenum and other M metals atoms, referred to as (Mo + N)/(Fe + M), be in the range of 0.4 to 5, and each of the atomic ratios N/(Mo + N) and M/(Fe + M) be in the range of 0 to 0.5.

Molybdenum may be introduced into the reaction mixture either as fresh molybdic anhydride or as any salt the anion of which contains molybdenum, except the alkali metal molybdates, the use of which results, in the best cases, in opaque and heterogenous gels. The ammonium salts are preferred (for example ammonium molybdate, heptamolybdate or paramolybdate, and dodecamolybdate), optionally with a small ammonia content.

Tungsten, chromium and manganese, in the form of oxygen-containing complexes, are preferably used as ammonium salts. As to uranium and vanadium, the ammonium uranates and vanadates can hardly be used; these elements are preferably used as oxygen-containing complexes, for example uranyl and vanadyl complexes. Uranyl nitrate and vanadyl oxalate are examples thereof. When a vanadyl salt must be used, an oxidizing substance such as hydrogen peroxide will be added to the starting mixture of compounds.

Those metals which may be used as simple cations (iron, cobalt, nickel, manganese, chromium, scandium, yttrium and the rare earth metals) are preferably introduced in the form of such salts as, for example, the nitrates, chlorides, acetates, formates, carbonates, bromides, oxalates or sulfates. The nitrates and sometimes the chlorides are preferred. These salts may be used together with small amounts of such inorganic acids as, for example, nitric acid, sulfuric acid, perchloric acid or any other strong acid.

The ferrous salts should be avoided since their reducing power is such that, when admixed with ammonium molybdates, they result in molybdenum blues whose separation makes difficult their further conversion to a gel.

The compounds of metals in the form of simple cations or oxygen-containing complexed ions are usually employed in their normal hydrated form (for example 4 molecules of water per molecule of ammonium paramolybdate or 9 molecules of water per molecule of ferric nitrate). They are also employed in a partially dehydrated form, particularly the metal compounds in the form of simple cations.

Water may also be added to the mixture of these products, in limited amount not higher than the total of the respective amounts required to form aqueous saturated solutions of the individual salts of the mixture. The maximal amount is partly dependent on the temperature at which the mixture is made: for example, with a mixture of 1/7 mole of ammonium paramolybdate tetrahydrate and 2 moles of ferric nitrate nonahydrate at 20° C, the amount of water must be lower than 800 ml.

In most cases, this process directly provides, i.e. without further dehydration, gels having a low content of water, for example between 10 and 30 % by weight.

A part of water may be substituted with any polar organic or inorganic solvent, for example, a primary, secondary or tertiary alcohol, either aliphatic or aromatic, a diol or a polyol, an amine, an amino-alcohol, an amide, an aldehyde, a ketone, an acid, an acid-alcohol, a keto-acid, an amino-acid, as well as tetrahydrofuran, dioxan, formamide or their derivatives, furaldehyde or dimethylsulfoxide, i.e. any solvent favoring the reaction between the starting salts. The amount of solvent, as well as water, is at most the total of the respective amounts required to form saturated solutions of the individual starting salts.

Two compounds of the metals in the form of oxygen-containing complex ions, those of the metals in the form of simple cations, or their mixtures, may be used together with a soluble inorganic salt, such as ammonium nitrate, ammonium chlorate or ammonium perchlorate.

The solid reactants may be at first roughly crushed, for example in a mortar, and then introduced into a crushing apparatus such as a mixer, a roll-mixer or a mortar mixer. A mixer with sigmoid blades gives the best results.

The mixture of the solid reactants is carried out at a temperature between the freezing temperatures of the saturated solutions of the said compounds and 150° C, for a time sufficient to obtain a gel.

When the reactants are crushed together, two types of reactions may take place, according to the atomic ratio (Mo + N)/(Fe + M) in the mixture of the starting materials.

When the atomic ratio (Mo + N)/(Fe + M) is between 0.4 and 1.5, the powder resulting from the admixture of the solid reactants transforms in a few minutes to a clear solution having a viscosity lower than about 1,000 centipoises at 20° C. When this solution is heated up to a temperature which is preferably selected between room temperature and 150° C, and the treatment is continued by mechanical crushing, it grows viscous and finally results in a homogeneous, rubbery and transparent gel.

When the atomic ratio (Mo + N)/(Fe + M) is higher than 1.5, the powder resulting from the admixture of the solid starting materials is transformed in a few minutes into a solution having a viscosity higher than about 1,000 centipoises at 20° C; this solution, which contains a few undissolved crystals, gives a homogeneous, rubbery and transparent gel.

The time necessary to transform the solution to a gel in the two above reactions is dependent on the type of mechanical crushing and the temperature at which the crushing is carried out. For example, with a mixer having sigmoid blades, the conversion time of the solution to a gel at 70° C, for an atomic ratio Mo/Fe of 1, is 3 hours. It is 30 minutes at 20° C with an atomic ratio Mo/Fe of 2.

The transparent gels obtained according to the above process may be used as light filters.

Within the above-defined range of atomic ratios (Mo + N)/(Fe + M), the gels obtained according to the process of this invention result after a further crushing for at least 2 hours at a temperature between 20° and 150° C, in a powdered substance having a pale yellow color when the used elements are only iron and molybdenum, and other colors when other metal compounds take part to the reaction. Water escapes more easily when air is passed through the treated mixture. This powdered substance has a content of water lower than 10 % by weight. It is amorphous from the crystallographic point of view and may be easily shaped by pilling, extruding or granulating. This shaping is of major interest when the products must be used as precursors or catalysts for oxidizing primary alcohols to aldehydes and more particularly methanol to formaldehyde, said use being described hereafter.

The gels and powdered products obtained by the above methods are precursors of mixed iron and molybdenum oxides, iron and molybdenum being partially substitutable with the other mentioned elements referred to as M and N.

These mixed oxides may be obtained by heat decomposition of the said gels and powdered products at a temperature of 300° to 500° C, more particularly between 350° and 470° C for a time lower than 6 hours, for example 1 to 5 hours.

This heat decomposition may follow a dehydration, for instance in an oven, at a temperature between 40° and 150° C, preferably between 50° and 90° C, for at least 6 hours and preferably 24 to 72 hours. The thus-treated gels slowly dehydrate to new gels which are also amorphous from the crystallographic point of view and transparent in the visible and infra-red range.

Some of these mixed oxides are catalytic materials for oxidizing primary alcohols to aldehydes and particularly methanol to formaldehyde. The mixed oxides which may be used as catalysts are those resulting from the heat decomposition of the gels and the powdered substances manufactured to the above method, however with an atomic ratio of the used components (Mo + N)/Fe + M) between 1.5 and 5.

The temperature of the pre-catalyst, during the heat decomposition, must not exceed 500° C, since overheatings may result in a further de-activation of the catalyst.

The thus-obtained catalyst is a green to yellowish green solid in the absence of additives; its color may change according to the nature and the content of additives. It has a fair mechanical strength; its specific surface is between 0.5 and 20$m^2$ per gram; the best results are obtained with catalysts having surfaces between 4 and 12 $m^2$ per gram.

The catalyst may be diluted by means of a catalytically inert material having a convenient grain size. The ratio by volume catalyst/(diluent + catalyst), may range between 0.1 and 1. The grain size of the diluent is preferably as close as possible to that of the catalyst.

The conventional inert diluents have different shapes (for example balls, cylinders or rings). They may consist, for example, of ceramics or alumina, silica, silicoalumina, glass or silicium carbide.

The particles of the diluent may be either admixed with the particles of the catalyst or divided in one or several beds over, below or inside the catalyst bed; as a rule they may be used before, behind or inside the catalyst bed. According to their place, the diluents may improve the heat exchanges in the catalyst bed. They may also reduce the abrading phenomena in the catalyst bed and limit the pressure drop therethrough.

The oxidation of methanol to formaldehyde is carried out by passing a mixture of a vaporized methanol and a molecular oxygen-containing gas through the catalyst bed at any pressure preferably close to the atmospheric pressure; the catalyst bed is preheated to a temperature between 250° and 450° C, preferably between 300° and 400° C.

Oxygen may be diluted with nitrogen or any other inert gas, optionally with inert gases such as steam or carbon dioxide. The proportions of inert gas and oxygen may be selected at will, provided explosion hazards are avoided. Air may be used instead of the mixture of nitrogen with oxygen.

The proportions of air and methanol are usually 3 to 15 % and preferably 5 to 7 % by volume of methanol in air; this mixture is passed through the catalyst bed at a velocity of 3,600 to 72,000, preferably 24,000 to 36,000 liters of the gaseous mixture per liter of catalyst and per hour, expressed under normal temperature and pressure.

The following examples are illustrative of this invention but not limitative thereof.

EXAMPLE 1

A gel containing iron and molybdenum in an atomic ratio of 2 has been manufactured as follows:

202 g of ferric nitrate nonahydrate (0.5 gram-ion of $Fe^{3+}$) and 176.6 g of ammonium paramolybdate tetrahydrate (1 gram-molecule of MoO$_3$) are crushed in a mortar. This results in a yellow powder which, when crushed in a mixer at room temperature, results in 15 minutes in a very viscous solution which transforms in 30 minutes, to a rubbery and transparent green gel containing 24 % by weight of water.

EXAMPLE 2

The gel of example 1 has been dehydrated for 2 days at 60° C in an oven; it results in a new transparent gel of brownish red color, containing 2 % by weight of water.

This gel has been heated for 4 hours in an oven at 420° C in an air stream. This results in a product of intense green color which has a specific surface of 7.6 m$^2$/g and an atomic ratio Mo/Fe of 2.

6 ml of this product have been introduced in a catalysis reaction vessel at 350° C. A gaseous mixture of air with a 6.6 % by volume methanol content is passed therethrough at an hourly volumetric velocity of 24,000 h$^{-1}$. The experiment takes 6 hours. 99.8 % by moles of methanol have been converted and the molar yield of formaldehyde was 96.9 %.

EXAMPLE 3

176.6 g of ammonium paramolybdate tetrahydrate (1 mole MoO$_3$) have been crushed in a mortar with 172.1 g of ferric nitrate nonahydrate (0.426 gram-ion of Fe$^{3+}$) and 10 ml of water.

The resulting yellow paste has been crushed for 30 minutes at room temperature and then 30 minutes at 50° C in a mixer with sigmoid blades. The resulting transparent green gel thus obtained has been dehydrated at 70° C in an oven for 48 hours and then heated for 3 hours in a fixed bed at a temperature between 400° and 450° C, under a light air stream.

EXAMPLE 4

The green catalyst obtained in example 3 has a specific surface of 4.4 m$^2$.g$^{-1}$ and an atomic ratio Mo/Fe of 2.35. 6 ml of this catalyst have been placed in a catalysis reactor wherein the bed was at about 350° C. Air with a 6.6 % content by volume of methanol was passed through the catalyst at an hourly volumetric velocity V.V.H. of 24,000 h$^{-1}$ for 5 hours.

99.6 % molar of methanol have been converted and the molar yield of formaldehyde with respect to methanol was 94.6 %.

EXAMPLE 5

Example 3 has been repeated, using manganese nitrate hexahydrate together with ferric nitrate nonahydrate.

This resulted in a catalyst having an atomic ratio Mo/(Fe + Mn) of 2.35 and an atomic ratio Mn/(Fe + Mn) of 0.08.

EXAMPLE 6

Example 3 has been repeated with a part of ferric nitrate nonahydrate substituted with an equivalent amount of chromium nitrate, and the addition of 100 g of ammonium nitrate to the mixture so as to obtain a catalyst having an atomic ratio Mo/(Fe+Cr) of 2.35 and an atomic ratio Cr/(Fe + Cr) of 0.08.

EXAMPLE 7

Example 3 has been repeated, except that a part of ferric nitrate nonahydrate has been substituted with the equivalent amount of cobalt nitrate hexahydrate, the ratio Mo/(Fe + Co) being 1.5.

EXAMPLE 8

A part of ammonium paramolybdate of example 3 has been substituted with ammonium metatungstate containing 92.05 % of tungstic anhydride. The ratio (Mo + W)/Fe was 2.

EXAMPLE 9

Molybdenum and iron have been substituted in part with vanadium and cobalt. The method was the following:

8.82 g of vanadyl oxalate, 88.3 g of ammonium paramolybdate tetrahydrate and 25 ml of an aqueous solution of hydrogen peroxide at 110 volumes have been crushed in a mixer having sigmoid blades.

The resulting blue paste progressively grows homogeneous and turns to dark red in 30 minutes at 20° C.

A second mixture of 95.34 g of ferric nitrate nonahydrate (0.236 gram-ion of Fe$^{3+}$) and 12.5 g of cobalt nitrate hexahydrate (0.042 gram-ion of Co$^{2+}$) is manufactured apart and added to the first mixture. The crushing has been continued for 15 minutes at 20° C, and then 1 hour at 45°-50° C. The product grows homogeneous and hardens; it is then dehydrated at 65° C for 2 days, and then heated for 3 hours at 420° C in an air stream.

The molar composition was as follows:

| MoO$_3$ | : | 72.46 % | Fe$_2$O$_3$ | : | 17.11 % |
|---|---|---|---|---|---|
| V$_2$O$_5$ | : | 4.20 % | CoO | : | 6.23 % |

The catalysts of example 5 to 9 have been tested under the conditions of example 2; the results are given in table I:

TABLE 1

| Example | M | N | $\frac{Mo + N}{Fe + M}$ | % molar conversion | % molar yield |
|---|---|---|---|---|---|
| 5 | Mn | '' | 2.35 | 99 | 95.4 |
| 6 | Cr | '' | 2.35 | 99.7 | 96.7 |
| 7 | Co | '' | 1.5 | 99.8 | 95.8 |
| 8 | '' | W | 2 | 99.6 | 95.7 |
| 9 | Co | V | '' | 97.2 | 95.1 |

What we claim is:

1. A process for manufacturing a transparent gel containing molybdenum and iron, comprising mechanically crushing a powdery to pasty initial mixture consisting essentially of at least one solid molybdenum compound, selected from the group consisting of fresh molybdic anhydride and an ammonium molybdate, at least one solid ferric compound, selected from the group consisting of a ferric nitrate, chloride, acetate, formate, carbonate, bromide, oxalate and sulfate, and at least one compound of a metal, M, selected from the group consisting of cobalt, nickel, manganese, chromium, scandium, yttrium and a rare earth metal of atomic number from 57 to 71 inclusive, said metal being used as a simple cation, the respective amounts of the said compounds resulting in an atomic ratio M/(Fe + M) from 0 to 0.5 and an atomic ratio Mo/(Fe + M) between 0.4 and 5, said mixture containing water in an amount lower than the total of the respective amounts required to form aqueous saturated solutions of the individual components, at a temperature between the freezing temperature of the saturated solutions of the said compounds and 150° C, said crushing resulting first in a homogeneous paste or viscous solution, said crushing being continued to result in a homogeneous and transparent gel.

2. A process as defined by claim 1, said water present in said mixture being water of hydration chemically bound to at least one compound of the initial mixture.

3. A process as defined by claim 1, said initial mixture being powdery.

4. A process as defined by claim 1, comprising the further step of heating the resultant gel at a temperature between 300° and 500° C to form a powdered substance.

5. A process as defined by claim 1, said water being present in sufficient quantity to form a resultant gel containing 10–30% by weight water.

6. A process according to claim 1, wherein ammonia is added to the molybdenum compound.

7. A process according to claim 1, wherein a strong inorganic acid is added to the ferric compound.

8. A process according to claim 1, wherein ammonium chlorate ammonium perchlorate or ammonium nitrate is added to the reactants.

9. A process according to claim 1, wherein the obtained gel is thereafter dried at a temperature between 40° and 150° C.

10. A process according to claim 1, wherein the obtained product is thereafter mechanically crushed at a temperature between 20° and 150° C for more than 2 hours, thus resulting in a powdered substance having a content of water lower than 10% by weight.

11. A process according to claim 10, wherein the powdered substance is thereafter dried at a temperature between 40° and 150° C.

12. A process as defined by claim 10, comprising the further step of heating the resultant powdered substance at a temperature of 300°–500° C.

13. A process according to claim 1, wherein the starting mixture, in addition to the molybdenum compound and the ferric compound, also contains at least one compound of a metal selected from the group consisting of chromium, tungsten, manganese, vanadium and uranium, referred to as N, said metals being in the form of oxygen-containing complex ions, the respective amounts of the said compounds resulting in an atomic ratio $N/(Mo + N)$ between 0 and 0.5 and an atomic ratio $(Mo + N)/(Fe + M)$ between 0.4 and 5.

14. A process according to claim 13, wherein the molybdenum is ammonium molybdate and the ferric compound is ferric nitrate and the ratios $M/(Fe + M)$ and $N/(Mo + N)$ are each between 0 and 0.5, the ratio $(Mo + N/(Fe + M)$ being in the range of 1.5 to 5.

15. A process as defined by claim 14, comprising the further step of heating the resultant gel at a temperature of 300°–500° C to obtain a powdered substance.

16. A process as defined by claim 15, comprising the intermediate step of drying the gel at a temperature between 40° and 150° C before heating same to 300°–500° C.

17. A process as defined by claim 14, comprising the further step of mechanically crushing the resultant gel at a temperature between 20°–150° C for more than 2 hours, thus resulting in a powdered substance having a content of water lower than 10% by weight, and heating said powdered substance to a temperature between 300° and 500° C.

18. A process as defined by claim 16, comprising the intermediate step of shaping said gel before it is dried and heated to 300°–500° C.

19. A process as defined by claim 17, comprising the intermediate step of shaping the dry powder into catalyst precursor shapes before heating resultant shapes to 300°–500° C.

* * * * *

UNITED STATES PATENT AND TRADEMARK OFFICE
CERTIFICATE OF CORRECTION

PATENT NO. : 4,000,085
DATED : December 28, 1976
INVENTOR(S) : Philippe Courty, et al.

It is certified that error appears in the above-identified patent and that said Letters Patent are hereby corrected as shown below:

[73] Assignee: should read -- INSTITUT FRANCAIS DU PETROLE, DES CARBURANTS ET LUBRIFIANTS RUEIL MALMAISON, FRANCE Claim 14, line 2: after "molybdenum", insert -- compound --.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*